US010878470B2

(12) United States Patent
Babcock et al.

(10) Patent No.: US 10,878,470 B2
(45) Date of Patent: Dec. 29, 2020

(54) FRAMEWORKS TO DEMONSTRATE LIVE PRODUCTS

(71) Applicant: ENTIT SOFTWARE LLC, Sunnyvale, CA (US)

(72) Inventors: David John Babcock, San Jose, CA (US); Spencer Firestone, Sunnyvale, CA (US); Jagadeesh Kandasamy, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 1653 days.

(21) Appl. No.: 14/478,420

(22) Filed: Sep. 5, 2014

(65) Prior Publication Data
US 2016/0071179 A1  Mar. 10, 2016

(51) Int. Cl.
*G06Q 30/06* (2012.01)
*G06F 3/0482* (2013.01)
*G06F 9/451* (2018.01)

(52) U.S. Cl.
CPC ....... *G06Q 30/0623* (2013.01); *G06F 3/0482* (2013.01); *G06F 9/453* (2018.02); *G06Q 30/0641* (2013.01)

(58) Field of Classification Search
CPC ..................................................... G06Q 30/06
USPC .............................................. 705/26.1–27.2
See application file for complete search history.

(56) References Cited

U.S. PATENT DOCUMENTS

| 6,317,783 | B1 | 11/2001 | Freishtat et al. |
| 6,345,239 | B1 | 2/2002 | Bowman-Amuah |
| 6,427,132 | B1 | 7/2002 | Bowman-Amuah |
| 8,756,407 | B2 | 6/2014 | Lim |
| 2007/0234196 | A1* | 10/2007 | Nicol ................ G06F 17/30038 715/205 |
| 2010/0325012 | A1 | 12/2010 | Standish |

FOREIGN PATENT DOCUMENTS

JP          2007-004346 A       1/2007

OTHER PUBLICATIONS

Siegel, D., & Rouchka, T. (Jul. 1, 2002). Demo-driven design or design-driven demos: Vaporware, demos, and prototypes. Retrieved Aug. 16, 2020, from https://dl.acm.org/doi/10.1145/543434.543449.*
ActivePresenter, 2014, pp. 1-3, Atomi Systems, Inc., Available at: <atomisystems.com/activepresenter/>.

* cited by examiner

Primary Examiner — Jeffrey A. Smith
Assistant Examiner — Jennifer V Lee

(57) ABSTRACT

An example system in accordance with an aspect of the present disclosure includes a framework to demonstrate and/or train at least one live product. The framework includes a first panel associated with at least one step, and a second panel to display content and at least a portion of the at least one live product according to the at least one step. The system also includes at least one script to perform at least one task associated with the at least one step. The at least one step is performable independent of an order in which the at least one step is presented by the framework.

20 Claims, 5 Drawing Sheets

FRAMEWORKS TO DEMONSTRATE LIVE PRODUCTS

BACKGROUND

Demonstrations and training for products, such as computer programs, can be challenging and complex. Varied demonstration environments, and the need to maintain demonstration environments in a "customer readiness" state, make it difficult to demonstrate relevant features in an easily understood manner that allows hands-on interaction.

BRIEF DESCRIPTION OF THE DRAWINGS/FIGURES

DETAILED DESCRIPTION

Products are available to help create product demonstrations. Although they may offer features for supporting static demonstrations replayed in various formats, other products may be limited to web-based products, and/or may be limited to demonstrating a single product. However, examples described herein enable guided demonstrations by engines that provide for interaction with one or more live products to be demonstrated, creating a dynamic and flexible experience that is not limited to a mere viewing of a recorded replay, for a more gratifying, interactive, and educational demonstration experience based on content, scripts, and/or other materials. As used herein, the term "demonstrate" may include demonstrating, training, supporting, helping, and otherwise providing assistance according to the examples provided herein. For example, demonstrating a product may enable fully interactive participation by users, who may view and actively use the product as it is being demonstrated (e.g., by demonstrating it to him- or herself). In an example, a demonstration may be used as a "walk-through" or support tool to guide a user through installation of a product, or through a support scenario to address a help call of a live product being used by the user.

A demonstration may be provided as a self-contained application, enabling focus to remain on demonstrating technical features/capabilities of the product to be demonstrated, without becoming distracted by a need to prepare the demonstration environment (computer system) itself. The demonstration may serve as a wrapper around one or more live products to be demonstrated, and guide the demonstration through the usage of those actual live products. Thus, examples described herein enable a customizable, multi-purpose, cross-platform framework for building guided live demonstrations. In an example, a demonstrator may look over a user's shoulder (literally and/or virtually) and point out features of a program. Examples provide unobstructed visual cues, automated and/or manual script triggers, and seamless process and/or window management with live products. Custom images and/or scripts may be incorporated easily, to augment the demonstration. Demonstrations may be packaged in a virtual machine (VM) package for ease of distribution, isolation from potential demonstration environment issues/conflicts, and simple restoration of modified data.

Figure 1:
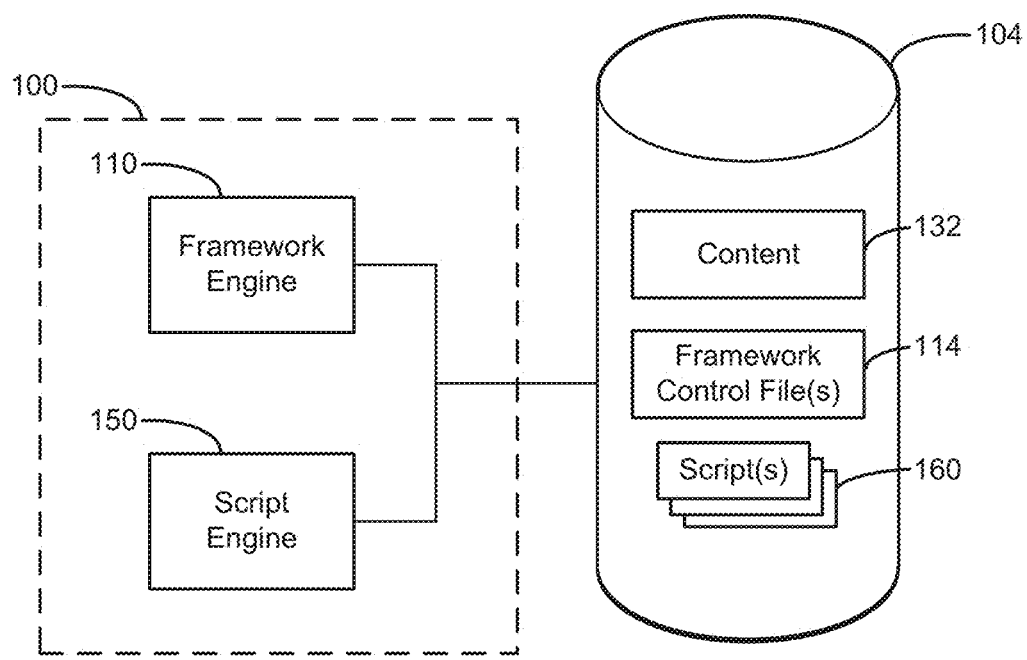
FIG. 1 is a block diagram of a system including a framework engine and a script engine according to an example.

FIG. 1 is a block diagram of a system 100 including a framework engine 110 and a script engine 150 according to an example. The framework engine 110 may perform functions related to demonstration/training of a live product, including arranging display of the content 132, operation/manipulation of the live product, interaction with steps and/or tasks, and other user interactions. The framework engine 110 may set an appropriate screen resolution of a computing system, and cache/scale/display the images/content 132 arranged in a framework user interface, including arranging user interface elements such as selectable steps, user prompts, and visual layout. The script engine 150 may configure and/or execute scripts 160, and otherwise perform functionality based on interaction with a displayed framework as generated by the framework engine 110 (e.g., based on user selection of a visual step element). The script engine 150 also may perform functionality automatically, e.g., in response to startup or shutdown of a framework, in response to a step/task, in response to a selection dialog, and so on. Examples of functionality of the framework engine 100 and script engine 150 may be found in further detail below, e.g., with respect to FIGS. 3-6. A directory 104 may be accessible by the system 100, to serve as a computer-readable repository to store information such as content 132, framework control file(s) 114, and script(s) 160 that may be referenced by the engines 110, 150 during operation of the engines 110, 150. As described herein, the term "engine" may include electronic circuitry for implementing functionality consistent with disclosed examples. For example, framework and script engines 110, 150 may represent combinations of hardware devices (e.g., processor and/or memory) and programming to implement the functionality consistent with disclosed implementations. For example, the programming for the engines may be processor-executable instructions stored on a non-transitory machine-readable storage media and the hardware for the engines may include a processing resource to execute those instructions. An example system (e.g., a computing device), such as system 100, may include and/or receive the tangible non-transitory computer-readable media storing the set of computer-readable instructions (e.g., software). As used herein, the processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

In some examples, the functionality of engines 110, 150 may correspond to operations performed in response to, e.g., information from the directory 104, user interaction as received by the framework engine 110, and so on. The directory 104 may be accessible by the system 100 as a folder or other organizational structure on a computer-readable storage media, in which to store items in a format that may be accessible by the engines 110, 150. For example, the directory 104 may represent a folder on a storage media, containing a script file 160 that the script engine 150 may retrieve from the directory 104 and execute to perform a task(s) associated with the retrieved script 160. In alternate examples, a plurality of directories 104 may be used to store a plurality of items and/or associated content.

Figure 2:
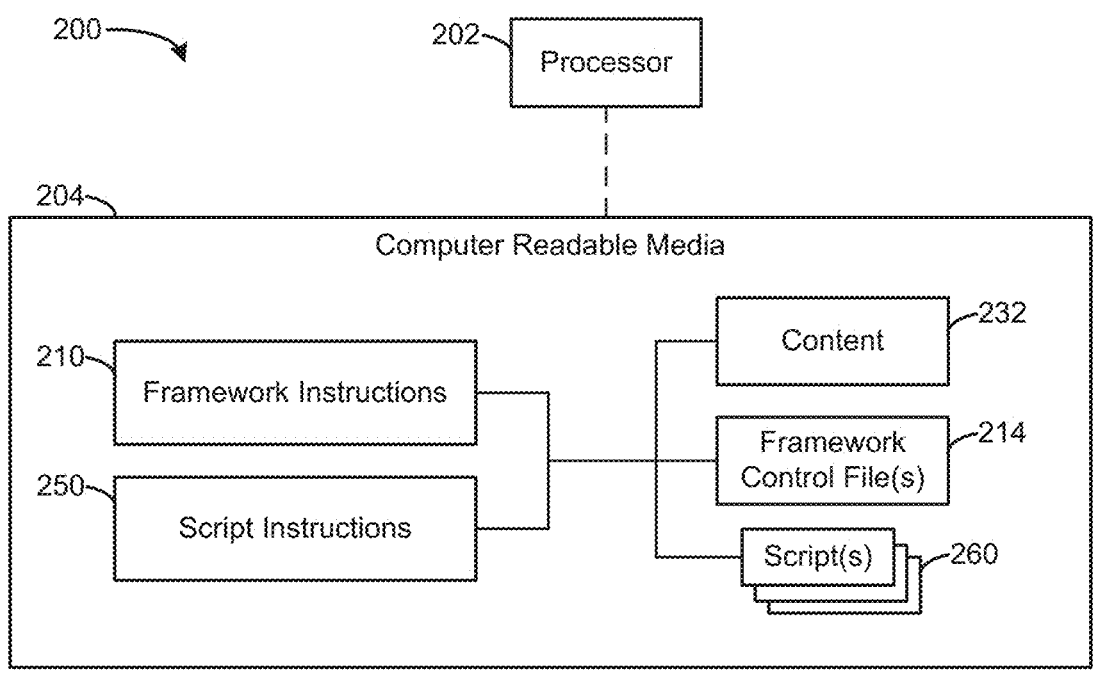
FIG. 2 is a block diagram of a system including framework instructions and script instructions according to an example.

FIG. 2 is a block diagram of a computing system 200 including framework instructions 210 and script instructions 250 according to an example. The computing system 200 may also include a processor 202 and computer-readable media 204, associated with the instructions, content 232, a framework control file(s) 214, and at least one script 260. In some examples, operations performed when instructions 210 and/or 250 are executed by processor 202 may correspond to the functionality of engines 210 and 250. In FIG. 2, the operations performed when framework instructions 210 are executed by processor 202 may correspond to functionality of framework engine 110 (FIG. 1). As another example, the operations performed when script instructions 250 are executed by processor 202 may correspond to functionality of script engine 150 (FIG. 1).

As set forth above with respect to FIG. 1, engines 110, 150 may include combinations of hardware and programming. Such components may be implemented in a number of fashions. For example, the programming may be processor-executable instructions stored on tangible, non-transitory computer-readable media 204 and the hardware may include processor 202 for executing those instructions. Processor 202 may, for example, include one or multiple processors. Such multiple processors may be integrated in a single device or distributed across devices. Media 204 may store program instructions, that when executed by processor 202, implement system 100 of FIG. 1. Media 204 may be integrated in the same device as processor 202, or it may be separate and accessible to that device and processor 202.

In some examples, the program instructions can be part of an installation package that when installed can be executed by processor 202 to implement system 100. In this case, media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 210, 250, content 232, framework control files(s) 214, and script(s) 260, one or more of elements 210, 250, 232, 214, and 260 may be located remotely from media 204.

The executable program instructions 210, 250, when executed by processor 202, may provide functionality as described above regarding system 100 and associated engines 110, 150 (FIG. 1). For example, framework instructions 210, when executed, may enable functionality similar to that of framework engine 110. Script instructions 250, when executed, may enable functionality similar to that of script engine 150.

The computer-readable media 204 may provide volatile storage, e.g., random access memory for execution of instructions. The computer-readable media 204 also may provide non-volatile storage, e.g., hard disk or solid state disk for storage of content 232, framework control file(s) 214, and script(s) 260. Components of FIG. 2 may be stored in any type of computer-readable media, whether volatile or non-volatile. The content 232 may include images, text, executable files, or other content that may be used by examples as set forth below. The framework control file 214 may contain configuration information or other information that may be used by the framework engine 110 and/or the script engine 150 to provide control or other information. The script(s) 260 may be used by the script engine 150 to perform various tasks as set forth below. A script 260 may, for example, be provided as a computer-readable text file accessible by the script engine 150. In alternate examples, a script 260 may include computer executable elements, such as instructions that are compiled and/or packaged for execution by a computing system under the direction of the script engine 150.

Figure 3:
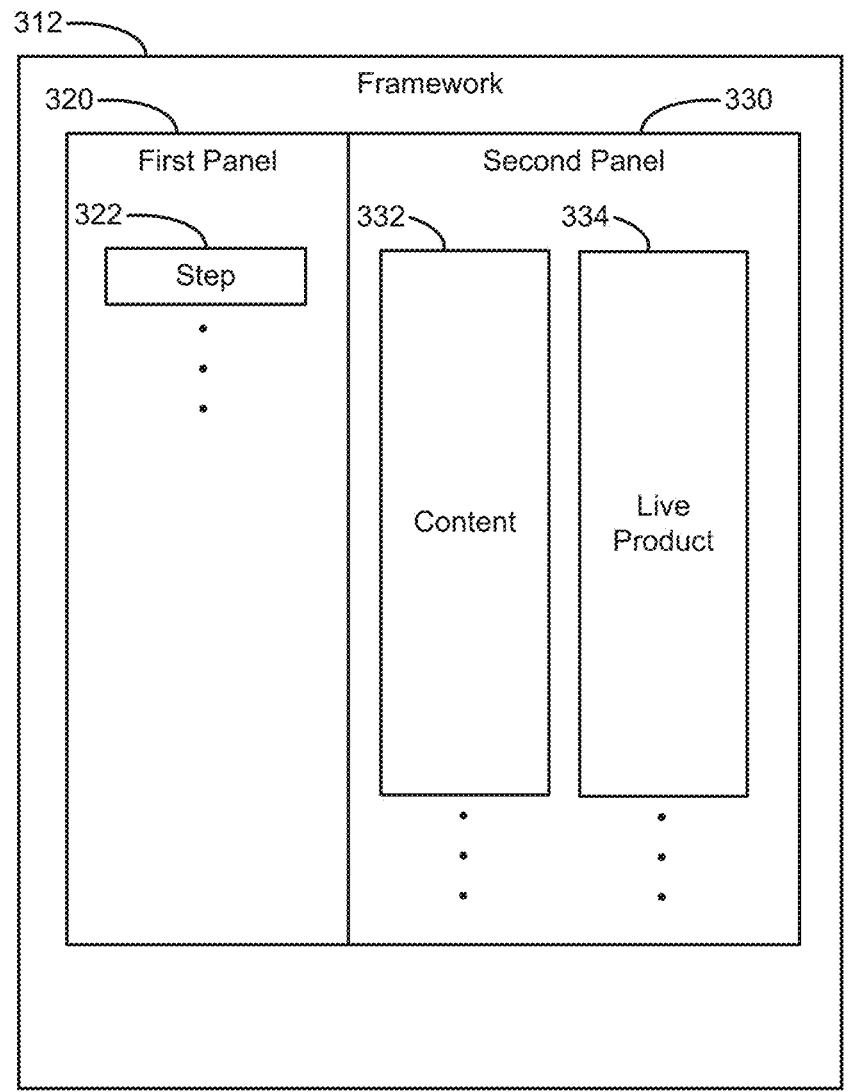
FIG. 3 is a block diagram of a framework including a first panel and a second panel according to an example.

FIG. 3 is a block diagram of a framework 312 including a first panel 320 and a second panel 330 according to an example. The framework 312 may be generated as an interactive graphical user interface by framework engine 110 (FIG. 1). The first panel 320 may be associated with at least one step 322. A step 322 may be provided by the framework 312 as an interactive graphical element that may be selected to trigger operation of a script, executable element, content, or other material that may be manipulated by a framework engine and/or a script engine. The second panel 330 may be associated with at least one content 332 and at least one live product 334. The step 322 may be associated with at least one script, which may be associated with at least one task. Example frameworks 312 enable interaction with real, live product(s) 334 to be demonstrated, providing guidance/demonstrations as to what actions to take while using the live product 334. Guidance may be provided using unobstructed visual cues/hints to an operator and/or participants, automated/manual script triggers, and process/window management. The demonstration may be guided by the framework engine 110 and script engine 150 (FIG. 1), based on various content, information, and materials that the framework engine 310 and script engine 350 are to reference (e.g., based on content 212, scripts 260, and/or the framework control file 214 shown in FIG. 2, that may specify a demonstration's layout, functionality, content, and so on). The materials may include custom images, text, scripts to be executed, at least one application to be demonstrated, and so on. The materials may be stored in a number of configuration directories for organization and for the framework 312 to reference. A configuration directory (e.g., directory 104 of FIG. 1) may represent its own demonstration, facilitating ease of switching between different demonstrations in a given session based on using multiple configuration directories corresponding to the multiple demonstrations. A given demonstration (e.g., configuration directory) may be run along with its corresponding one or more live product(s) 334 (e.g., a computer application), enabling guided assistance that may be displayed so as not to obstruct the live product 334 in a way that would interfere with learning.

A demonstration may easily "go off script," enabling the framework 312 to show other features of the live product(s) 334. The framework 312 may use custom graphics (content) that can change with progression through the step(s) 322 of the demonstration, to provide context for what is being demonstrated and reinforce the demonstration's marketing message. The framework 312 also provides the ability to execute native script(s) 260 (FIG. 2) to perform custom tasks, automatically as the demonstration progresses through step(s) 322 and/or task(s) associated with script(s) 260, or through manual links (e.g., by clicking a hyperlinked step 322). A demonstration may proceed in a logical order, while still allowing the step(s) 322 to be randomly executed (e.g., by a user, which may include a demonstrator, observer, etc.) to best meet the needs of the given demonstration. Systems based on the framework 312 do not need to retain states or contexts of the live product 334, and may manipulate the live product 334 directly based on a stateless and context insensitive live demonstration interaction. Thus, the framework 312 does not need to rely on modifications to, and/or integration with, an application/live product 334 to be demonstrated. Systems based on the framework 312 may take advantage of standard, live products 334 installed on a given machine environment, that may be installed and/or launched separately from the framework system. Because examples of the framework 312 are not limited to demonstrating a single application (live product 334), framework 312 enables the cohesive demonstration of multiple applications that may simultaneously work together as a system/unit.

In an example, a demonstration system based on the framework 312 may operate based on framework control information, scripts, images, a program(s) to enable platform-independent functionality of the framework and script engines (e.g., Java programs), and an environment to provide a native look and feel of the windows and interfaces etc. of the system (e.g., Java application(s) using Standard Widget Toolkit (SWT)).

An example framework engine may generate framework 312 and an associated user selection window prompt, in response to starting up the framework engine. The user selection window prompt enables the framework 312 to receive a user selection of which demonstration, from a plurality of available demonstrations, to execute (e.g., via a configuration selector dialog). Selecting a demonstration causes the system to load a corresponding framework control file (and relevant associated components/features, such as content 332 and/or live product 334), and start running the demonstration. The demonstration may be exited, and in response, the system may again prompt for selection of a demonstration. The same demonstration may be chosen again, to reload the demonstration and corresponding components. Accordingly, the system facilitates easy and dynamic editing/changing of scripts and/or other features in real-time, whose edits may quickly and easily be reloaded to check for desired performance of the demonstration. Such demonstration configuration/behavior information may be edited by hand (e.g., via a text editor), and also may be edited graphically (e.g., via a script builder or other graphical editing interface to manipulate various elements). Furthermore, a system may be deployed with a collection of various demonstrations, such as a suite of demonstrations for a given category of product(s).

Other implementations are possible for various components of example systems based on the framework 312, as generated by the framework engine 110 (FIG. 1). As set forth above, Java properties files may be used for key-value pair configurations for concise and rapid demonstration creation/modification. Alternatively, Extensible Markup Language (XML) with an XML Schema Definition (XSD) for validation may be used. For Linux, Mac Operating System, and/or Windows environments, basic shell scripting, Visual Basic Script (VBScript), and/or standard command line interfaces may be used. Components also may be implemented in other available languages, such as C, C++, C#, etc.

The system also may perform functions related to a demonstration, including the content 332, live product 334, and/or any related steps 322, scripts, and/or tasks. The system may set an appropriate screen resolution of the computing system, the images/content 332 may be cached/scaled, and script(s) may be configured and/or executed. Exiting a demonstration of the system may enable the system to execute relevant startup and shutdown script(s), and present a demonstration selector dialog/prompt. The system similarly may be exited.

With reference to FIGS. 1-3, the script engine 150 is to enable the system 100 to support and/or execute script(s) 260. A script 260 may be run from a system command line, automatically (e.g., upon startup/shutdown of a configuration/demonstration, in response to another script 260, in response to a step 322/task, etc.) and/or in response to user interaction, such as selecting a hyperlink portion of a step 322. Scripts 260 may include 'helper scripts,' which may be executed, e.g., in association with providing guidance in a step 322. For example, a demonstration may walk through a complex sequence of steps 322 to educate a user, but bypass at least a portion of the walk-through by executing a helper script to do at least some of the operations without needing user input. In an example, a helper script may offer to 'add a comment,' and in response to being executed/clicked, the helper script may email a selected comment without the user needing to launch an email program.

An example system may check for and/or manipulate attributes of content 332 and/or live product(s) 334. For example, the system (e.g., via script engine 150) may execute a script 260 to check for a presence of a live product 334 that is to be demonstrated. If the live product 334 is not present (e.g., not installed on the current computing environment), the system may display a message informing the user to install and/or execute the live product 334, and/or may automatically install the live product 334. In an alternate example, the system may display a substitute demonstration that includes a series of images to simulate operation of the live product 334, in response to identifying that the live product 334 is not present.

Accordingly, the system does not need to be integrated with, or otherwise need to be connected with, a particular live product 334 that is to be demonstrated. Similarly, a live product 334 does not need to be modified to have awareness of, or otherwise be connected to, the framework system. The system may serve as a framework for multiple live products 334 and/or content 332 simultaneously, as a system of applications. Furthermore, the live products 334 to be demonstrated are not limited to mere front-ends for web-based applications. The system may provide a general demonstration framework compatible with not only web applications, but also stand-alone or custom applications and/or live products 334.

Figure 4:
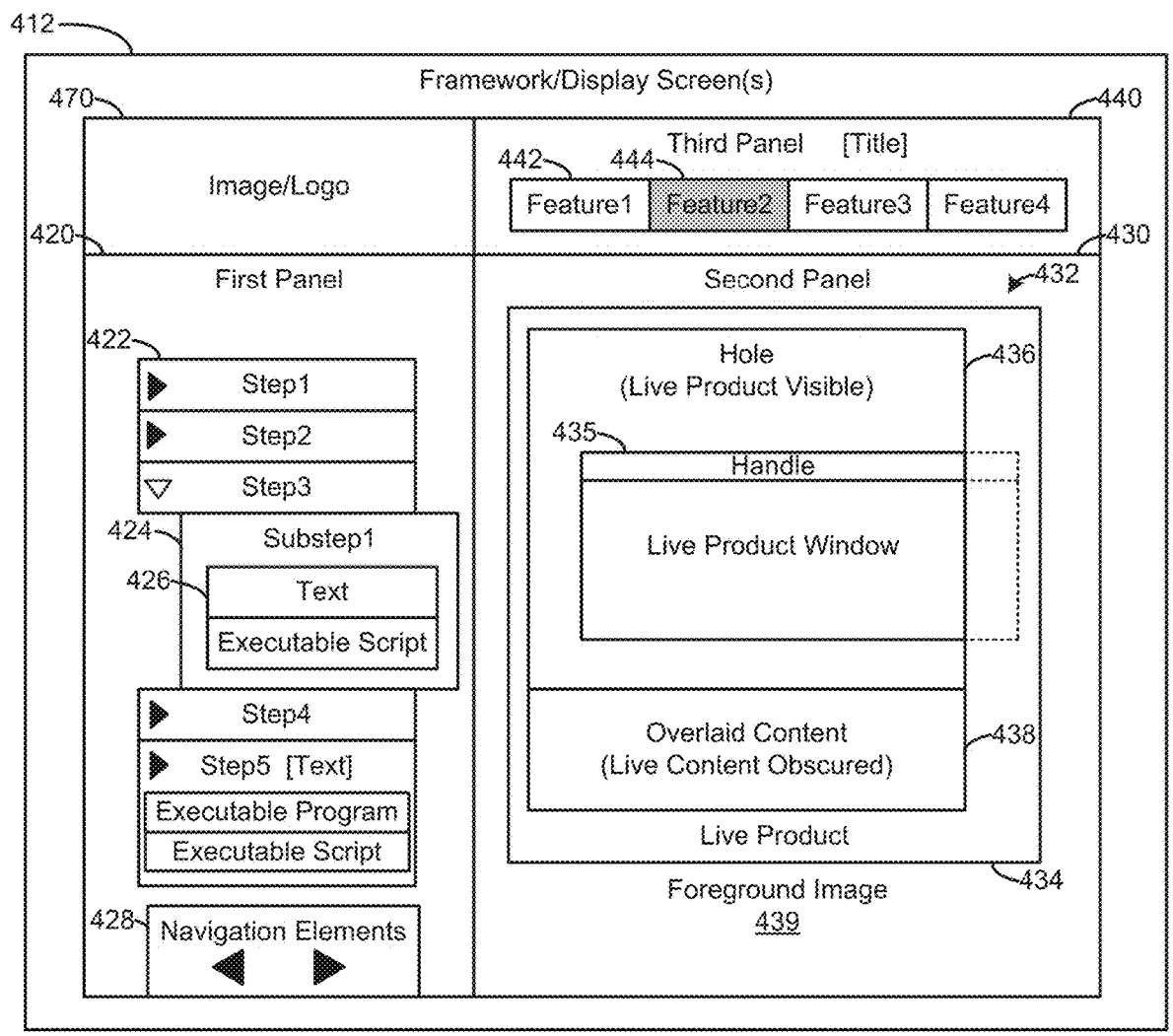
FIG. 4 is a block diagram of a framework including a first panel, a second panel, a third panel, and an image/logo according to an example.

FIG. 4 is a block diagram of a framework 412 including a first panel 420, a second panel 430, a third panel 440, and an image/logo 470. The first panel 420 may be associated with at least one step 422, substep 424, step element 426, and navigation element 428. The second panel 430 may be associated with content 432, live product 434, live product window 435, hole 436, overlaid content 438, and foreground image 439. The third panel 440 may be associated with feature 442 and highlighted feature 444.

The framework 412 (e.g., as directed by a framework engine) may arrange the size and/or content of the panels based on the framework control file 414. Furthermore, the framework 412 may vary the panels and/or content, such as whether to include the logo 470, one or more panel(s) (e.g., the third panel 440), various labels, steps 422, text, particular wording chosen throughout the system, and so on. The image/logo 470 enables the system 400 to have a branding capability and visual customization, including an associated "About" dialog box.

The first panel 420 contains step(s) 422/424 and navigation element(s) 428. The demonstration may display the steps 422 as on-screen line items and collapsible sub-items (such as substep 424 and step elements 426). As shown, a step 422 (such as step5) also may contain step elements, which are not limited to a substep 424. The steps 422 of the first panel 420 may be traversed by explicit selection, keyboard arrows, forward/back buttons, or other navigation elements 428, 442. The steps 422/424 are illustrated in a particular order (Step1, Step2, Step3 . . . ) that may be conducive for a given presentation/demonstration. However, the steps 422/424 may be selected independent of the order in which they are displayed/presented. Thus, a user may click on Step2, manipulate the live product 424, then click on Step5, etc., without a need to follow any strict order. The various elements of the first panel 420 are to navigate through a demonstration, and may be used to present text or other elements as further information and/or hints to the operator (e.g., what action to take next in the live product 434). In an example, a step 422 may be expandable to reveal its sub-element(s)/step(s) based on a Java SWT ExpandBar element, according to configuration information in the framework control file 414 pertaining to that step 422. A step 422 may contain references to the features used, frames/holes, scripts, images, substeps, or other content on other panels (e.g., second panel 430 and third panel 440).

In response to navigating to an expandable step 422 (via direct click, navigation elements, keyboard, etc.), the framework 412 may expand that step, and/or contract a prior-expanded step. Step expansion may involve displaying its substeps 424/elements 426, changing a foreground image 439, adding or removing holes or frames 436, and/or executing a script 460. A substep 424 may include elements 426 such as text, executable scripts, executable programs, and other substeps. Thus, a substep 424 may include functionality of a step 422, but at a lower hierarchical level. Steps 422 may be nested as substeps 424 an arbitrary number of levels deep.

A step 422 may include elements 426 that make reference to scripts 460. For example, substep 424 may include reference to an executable script element based on an HTML anchor contained in the text 426 of the substep 424. The framework 412 may convert the HTML anchor text of the step to a clickable script execution hyperlink. Thus, elements associated with a framework engine, such as framework 412 and graphical steps 422, may interact with elements associated with a script engine, such as executable scripts, text, and/or programs etc.

The first panel 420 may include navigation buttons or other navigation elements 428, to progress/regress through the steps 422 and/or substeps 424. In an example, the navigation elements 428 may progress/regress in a stepwise fashion, whereby display of one step/substep corresponds to each click of the navigation elements 428. Navigation also may be accomplished based on keystrokes. For example, the keyboard up and left arrows may be linked to the "previous" navigation element 428, and the right and down arrows may be linked to the "next" navigation element 428. Other keys may be linked by the framework 412 to accomplish other navigational tasks, such as by linking the Home key to an initial step 422 in the first panel 420. The example framework 412 enables freedom to navigate in multiple different ways, including out-of-order navigation that deviates from the order of the steps 422. Thus, example framework 412 enables a demonstration to go off-script and allow multi-dimensional navigation to jump around in the various steps 422, while still maintaining control over the displayed content/messaging for effective demonstration of the live product 434 or other content 438.

The steps 422 of the first panel 420 may serve as triggers to change content in the second panel 432, including changes to images 438, 439, the addition/removal of holes 436, the execution of a script 460/426, and/or the toggling of highlighting 444 of one or more features 442, among other effects. The steps 422 also may be navigated to, and/or selected, indirectly. For example, clicking on a feature 442 of the third panel 440 may cause the framework 412 to select a particular step 422, such as a step4 (i.e., not necessarily the first listed step in first panel 420) that corresponds to the use of that clicked feature. In an alternate example, an initial/default step 422 may be configured to be first displayed when the framework control file 414 corresponding to a given demonstration is opened, thereby designating a default initial step 422 to guide the user.

The steps 422 may be fully customized, independent of the live product 434. Thus, the framework 412 enables demonstrations to accommodate varying audiences, whether novice or expert. In an example, text accompanying a step 422 (or series of steps/substeps) for a novice demonstration of a live product 434 may be verbose and helpful/explicit, in contrast to the text for step(s) 422 for an expert demonstration of the same live product 434. A given demonstration may include steps 422 customized for various audiences, including the ability to skip steps 422 that may not apply for a given audience (e.g., via an automated helper script). A demonstration enables a user to interact directly with the live product 434, allowing steps 422 to be selected out of order, and even allows complete disregard of the steps 422 altogether.

The steps 422 may include explicit and implicit steps. The explicit steps may be executed based on being specifically selected. The implicit steps may be executed indirectly/automatically, e.g., in response to other actions. For example, an implicit step may be triggered in response to entering, executing, and/or exiting another step 422. An automatic script 460 or executable program may run in response to the implicit step, even by virtue of navigating to another step 422, without needing to select/click anything. An implicit step 422 may be performed as a startup and/or shutdown script, which execute in response to launching or exiting a demonstration and/or framework 412.

The various attributes of a step 422 may be specified in the framework control file 414, to designate corresponding step text, associated executable scripts/applications, and/or entry/exit executables that are executable implicitly or explicitly in response to the step 422. In another example, an implicit step may manipulate the live product 434. For example, a step 422 associated with a particular live product window 435 may be explicitly selected, while also implicitly launching the corresponding live product 434 to open the corresponding live product window 435 (e.g., based on a script 460 to launch the product/window) for illustrating that explicitly selected step 422. Upon leaving that step 422, the step may implicitly and automatically trigger a script 460 that would close the live product window 435 and/or the live product 434, if no longer needed after that step 422. In an alternate example, an implicit step/script may resize/reposition the live product window(s) 435 to provide a clean arrangement (e.g., ready for demonstrating the next step), such that the demonstration is robust and easy-to-follow even if a user unpredictably rearranges windows and/or applications prior to a step. Explicit steps/scripts may be triggered via selecting hyperlink helper scripts in a step 422. Implicit steps scripts may be triggered when starting/ending a step, demonstration, or the framework 412.

Such implicit/explicit steps 422 enable fault-tolerant demonstration design, to handle situations that may arise due to the user having freedom to interact with the live product 434, take the steps 422 out-of-order, or otherwise go off-script. A given step 422 may demonstrate one particular setting, that may happen to be built-upon and/or relied on in later steps. For example, a step 422 may request that the user establish a country location. However, the user may go out of order, and skip that step and thereby fail to establish the country location, causing issues with later steps that rely on the country location. Accordingly, a step 422 may accommodate such situations by having a step be functionally equivalent to being independent of other steps. Thus, if the user skips the step to establish country location, the following step will not fail because the framework 412 may detect and supply such information on behalf of the user, based on implicit steps 422. An implicit step 422 may automatically run a script 460 to check whether the example country location has been set, and if not, select a default country location for the user before proceeding to the next step 422, or specifically prompt for such information. The framework 412 may silently perform such implicit steps, and may inform the user what action has been taken on his/her behalf. Similarly, implicit scripts may check whether a live product 434 has been installed, and if not, the framework 412 may silently/verbosely install the live product 434 for use by the user, before proceeding to the next step that is to interact with the live product 438. Accordingly, the framework 412 enables robust and fault-tolerant independent operation of the various steps 422, regardless of what actions a user may take, while still enabling freedom to deviate from a suggested order of steps.

The second panel 430 may serve as a large, "main" panel to contain content 432 that may be relevant to the current step 422. Such content 432 may include an image 438, 439, a live product 434, a hole 436, a live product window 435, or other content. In an example, the framework 412 may configure the second panel 430 in response to a step 422 that has a frame property set, to thereby set a hole 436 to frame the entire size of the second panel 430. Such a configuration may be used to fill the second panel 430 with the live product(s) 434 that are actually being demonstrated. A step 422 may establish a blank background/foreground, or may set an image as the foreground image 439, which may be subject to image scaling properties described below. The step 422 may not use a frame mode, and may define a hole 436 in the second panel 430, subject to hole scaling properties described below.

The holes 436 are configurable vacancies formed in the foreground image 439, allowing underlying content 432 (such as the live product 434 and/or an image/text) to be revealed through the hole 436. Thus, the holes 436 may accommodate a window system (e.g., Microsoft Windows®) that is based on giving focus control to an application that is in a foreground, because the holes 436 reveal information that would otherwise be obscured by portions of the framework 412 (e.g., foreground image 439) that would have focus. Furthermore, the navigation elements and panels of the framework 412 may retain focus ready to receive navigation and other user input, while ensuring that the live product 434 may be visible, even if the window system environment (e.g., an operating system of computing system 400) has switched focus away from the live product 434 to the framework 412. Such independent interface features enable the framework 412 to provide straightforward and easy to follow demonstrations, while still retaining the ability to interact with the live product(s) 434. Image/text content 432, such as overlaid content 438, corresponding to a contextual step 422 may be configured and displayed in the second panel 430 without needing to rely on hole(s) 436. One or more holes 436 may be positioned in an image content 432, to enable live product(s) 434 to be operated inside the image content (e.g., to surround at least a portion of the live product 434 with a helpful/descriptive image/text).

In an example, a calculator live product 434 application may be demonstrated by framework 412 based on the use of a graphic/image content 432 having a hole 436 large enough to reveal the calculator application through the image. The calculator application, hole, and image may be properly positioned (e.g., based on their attributes such as size/position/zoom/rotation) such that corresponding arrows and descriptive text in the image are positioned to properly refer to the calculator application for demonstration purposes. Similarly, the framework 412 may position an image through a hole to serve as an informational pop-up window, to reference a given feature of the calculator live product 434 application.

Referring back to FIG. 4, the second panel 430 may include content 432, such as images/text, to depict concepts/overviews, set a context to deliver a product/feature message, or otherwise annotate the live product 434. In an example, the framework 412 may cause the second panel 430 to display informational content as a slide with an image describing what is to be demonstrated next, and then follow with a script that automatically reveals what aspects of the live product 434 are to be manipulated to accomplish the earlier-demonstrated features. Thus, even if a user (who is demonstrating the live product 434 to other users) does not have knowledge of the live product 434, the framework 412 may guide that user along and provide instructional guidance separate from the live product 434, while also directly manipulating the live product 434 and/or allowing the user to manipulate the live product 434. Accordingly, the framework 412 enables the user, despite his/her lack of knowledge, to appear competent and knowledgeable of the live product, based on guidance targeted directly to that user that is not visible to the audience (e.g., based on using multiple displays, such as a laptop display for the user and a projector for the audience).

The framework 412 may be compatible with images (content 432) provided in various formats, such as bitmap (BMP), Joint Photographic Experts Group (JPG) format, and so on. The content may be located in an images subdirectory for a given configuration/demonstration directory. Images may be organized in another subdirectory of the images directory, and their corresponding path may be listed in the image property. Images can be scaled/positioned based on scaling properties for the images. A default image may be specified (e.g., default.bgimg property), such that a step 422 that does not specify an image property may use the default image.

Hole(s) 436 may be defined by a step 422, via the framework control file 414 that specifies the steps 422. A frame mode property, if specified by a step, may provide a hole 436 sized to fit the entire second panel 430. A hole 436 may be positioned relatively or absolutely, and scaled according to scaling properties (see below) that may be set forth the in the step 422 as specified by the framework control file 414. The framework 412 may customize various features, including omitting features (e.g., there may be zero or more holes/content 432).

Various features/attributes of the framework 412 may be customized, e.g., based on the framework engine 110 (FIG.

1), framework control file 214 (FIG. 2), and/or the script engine 150 and script(s) 260. A panel 420, 430, 440, 470 may be configured based on absolute dimensions or with relative/dynamically determined dimensions. Thus, there may be a need to scale the content 432, including the images/holes, in view of the panel scaling. The framework 412 may automatically detect screen resolution and adjust the content 432 accordingly. Thus, demonstrations are screen-size neutral, and may size themselves to any suitable display screen(s). In an example, content may be positioned based on relative proportions (e.g., 75% of the way across the screen). In an alternate example, content/positioning may be pre-scaled to multiple different resolutions (e.g., saved as different sets of asset groups/directories) to address different sets of popular screen resolutions. The framework 412 may, upon startup, provide a menu choice to select which of the resolution sets should be used for a demonstration.

The holes 436 may be scaled by the framework 412. A hole 436 may be defined to include dimensional and/or scaling properties. If the scaling property is not set, a default may be used. Hole properties may be validated by the framework 412 to ensure that a hole does not exceed dimensions of the second panel 430. Absolute scaling may treat a hole's subproperties (x, y, width, and height) as pixel definitions independent of actual dimensions of the second panel 430 (subject to validation). Relative scaling may treat the hole's x, y, width, and height subproperties as percentage definitions as a function of the actual dimensions of the second panel 430.

The image content 432 similarly may be associated with image scaling subproperties. The scaling may be based on stretching the image vertically and/or horizontally to fit a width and height of the second panel 430. Proportional scaling may be used to proportionally scale image content to fill one of the scaled dimensions, such that the other scaled dimension will not be cut off. Remaining dimensions may be padded either to the right or below with blank space. An image may be proportionally scaled to completely fill one of the dimensions such that the other dimension will not be cut off. Absolute scaling may be used to maintain the image's size/scaling.

The framework 412 may align live product 434 applications/content 432 to correspond to each other and the holes 436, based on scaling the content 432 and/or manipulating attributes of the live product 434 and/or live product window(s) 435. The framework 412 may resize, move to different locations, or otherwise manipulate content/products as desired (e.g., as specified in the framework control file 414). However, the framework 412 enables a user, during a demonstration, to alter the live product 438/live product window 435. Thus, a user may unpredictably maximize, move, zoom, or otherwise interfere with a prepared arrangement of content 432/live product 434. Accordingly, the framework 412 may execute scripts 460 (e.g., implicit/helper scripts) to automatically reposition or otherwise manipulate content 432 and live product 434 to properly fit together as desired within the second panel 430. This may include restarting live products closed by the user, testing for the presence of live products/windows, launching live products/windows, directing web-based applications to specified web addresses, resizing elements, and so on, to provide customized and robust/failsafe demonstrations that are easy to navigate for a user.

The framework 412 may directly manipulate the live product 434 and its associated live product windows 435, based on platform-independent process creation and/or manipulation. In an example, framework 412 may create, terminate, or conditionally create processes associated with the live product 434 using Java Native Access (JNA) for platform-independence. JNA is a set of libraries in Java to enable the manipulation of windows, such as the live product window 435 and/or the live product 434. More specifically, JNA may be used to call into appropriate platform-specific libraries used to select the appropriate window handles and operate on the handles. JNA may be used to create a Window/Process Management Factory, to instantiate an appropriate window and/or process manager based on the running operating system of the computing system 400. A process manager may use JNA to call into the specific platform's libraries. In alternate examples, other implementations (e.g., wmctrl, which is a wrapper around the Linux window management C library) may be used for starting and/or terminating processes, resizing/moving windows, and so on. Similar to scaling the holes/images, windows also may be manipulated based on fixed and/or relative metrics. Thus, a demonstration may be set up to demonstrate a product according to a polished appearance with robust fault-tolerance in view of users starting, terminating, or otherwise manipulating applications outside of a suggested progression of the demonstration.

The optional third panel 440 may include a title associated with a demonstration, along with a set of features 442. The title also may be provided in another panel, such as the image/logo panel 470. A feature 442 may be displayed graphically in the framework 412 as a box with text. Features 442 may be used to represent corresponding features of an application and/or demonstration, solutions being demonstrated, and/or scenarios being demonstrated. The third panel 440 may include zero or more feature(s) 442.

A feature 442 also may serve as a navigation tool, to navigate to the steps 422. The steps 422 may be organized by chapter or other subdivision of a demonstration. Such subdivisions may correspond to a feature, a theme, a user scenario, and so on that are referred to as features 442. A feature 442 also may be one of a list of orthogonal features related to a live product 434 to be demonstrated. A feature 442 may be anything of the demonstration that is to be highlighted, and the feature 442 itself may be graphically highlighted 444. Thus, the highlighted 444 feature may indicate what feature corresponds to a step 422 or substep 424 that is active. For example, a step 422 may be associated with one or more feature 442 buttons in the third panel 440, such that by clicking on a feature 442, the framework 412 navigates to a first (or other relevant) step 422 of that feature 442, to demonstrate that feature 442 (which may be highlighted 444 in response to the clicking). The step 422 may be associated with various scripts 460 as set forth above, to demonstrate that feature 442. The third panel 440 is optional, and may be omitted entirely, and may include zero features 442 to simply illustrate the title.

A feature 442 may be deselected (e.g., grayed-out) by default, and may be configured to be highlighted 444. The highlight 444 may be based on which step, associated with the feature 442 to be highlighted 444, is active in the demonstration. A feature 442 can provide a navigational link to a step 422 by appending a step number value to the feature definition, as specified in the framework control file 414. If so specified, clicking that linked feature 442 will cause the demonstration to navigate to the specified step 422. The features 442 may be provided on multiple levels, including nesting a sub-feature from a parent feature.

The framework 412 may optionally include an image/logo 470 panel. This panel may display an image, e.g., in a logo.img definition of the framework control file 414, when applicable and present in the corresponding demonstration directory. The image/logo panel 470 may be interactive, allowing for selecting (e.g., left-clicking and holding for a threshold time period) this panel 470 to display a pop-up "About" dialog, to provide information specified in a properties portion of the framework control file 414. In an alternate example, other features may be associated with the image/logo 470. For example, a script, task, executable, or other content may be performed/displayed in response to clicking on the image/logo 470. The image/logo 470 may use the framework image/hole scaling properties set forth above, to scale the image/logo 470.

The framework 412 (e.g., as set up according to a framework engine) may be operated according to the scripts 460 as manipulated by the script engine 450, as specified in the framework control file 414 (and as referenced by the steps 422 to carry out tasks). A script 460 may be a series of steps to be carried out by the script engine and/or framework 412, similar to a macro, and may call executable applications and/or other scripts. Scripts 460 may be stored as stand-alone files in a scripts subdirectory of a demonstration directory. The framework may direct the script engine to run a startup script 460 in response to opening an associated demonstration, and run a shutdown script 460 in response to closing the associated demonstration. A script 460 may be executed by the framework 412 (e.g., in response to a click or navigation to a corresponding step 422) based on a command line call, which may depend on a type of platform and associated particular command line syntax. For example, shell scripts may be used for Linux platform command lines, and visual basic (VB) scripts may be used for Windows platform command lines.

The framework 412 may support a single display screen and/or multiple physical display screens. FIG. 4 illustrates the example framework 412 as having the first panel 420 and corresponding steps 422 adjacent to the second panel 430 and associated content 432/live product 434. However, such illustration is merely for convenience, the panels may be separate from each other, and the framework 412 supports multi-screen computing systems 400 (e.g., dual-screen, triple-screen, etc.). For example, one screen may be a laptop display facing the user, and a second screen may be a projector facing an audience. Thus, the framework 412 may display the steps 422 (and associated guidance text) on one screen, and the content 432/live product 434 on a second screen separate from the first screen. More specifically, the panels 420, 430, 440 may be separated from each other into individual windows, and assigned to separate screens, including separate physical screens. The panels of the framework 412 are not limited to being together, e.g., on the same screen, as specifically illustrated in FIG. 4.

The framework 412 and associated elements of one or more demonstrations (framework engine 110, framework control file 214, and script engine 150, see FIGS. 1 and 2) may be provided as computer-readable media 404. For example, provided as a collection of executable programs along with a directory structure (including subdirectories as appropriate) to contain relevant content. A collection of one or more demonstrations may be provided as subdirectories in a main directory. A subdirectory corresponding to a demonstration may include a top-level framework control file 414, such as a demo.properties file. Also within the main directory may be an images directory as the configuration's root image directory, and a scripts directory as the configuration's root script directory. Other materials/content also may be stored in these or other directories, and may be used by the various scripts 460 and/or steps 422.

The demonstrations may be packaged as a virtual machine (VM), along with any relevant materials including the live products 434 to be demonstrated. A VM may include pre-configured and complicated live product(s) that are already in a pre-installed state via the VM installation, avoiding installation problems/conflicts and ease of distribution. Furthermore, a database (or other data) referenced by the demonstration may be stored in the VM, such that resetting the data may be as simple as reloading the VM, avoiding issues with data manipulation/loss. One or more relevant operating systems also may be included as appropriate. Other incidental materials may be packaged with the demonstration, such as documentation, licensing terms, and so on.

Figure 5:
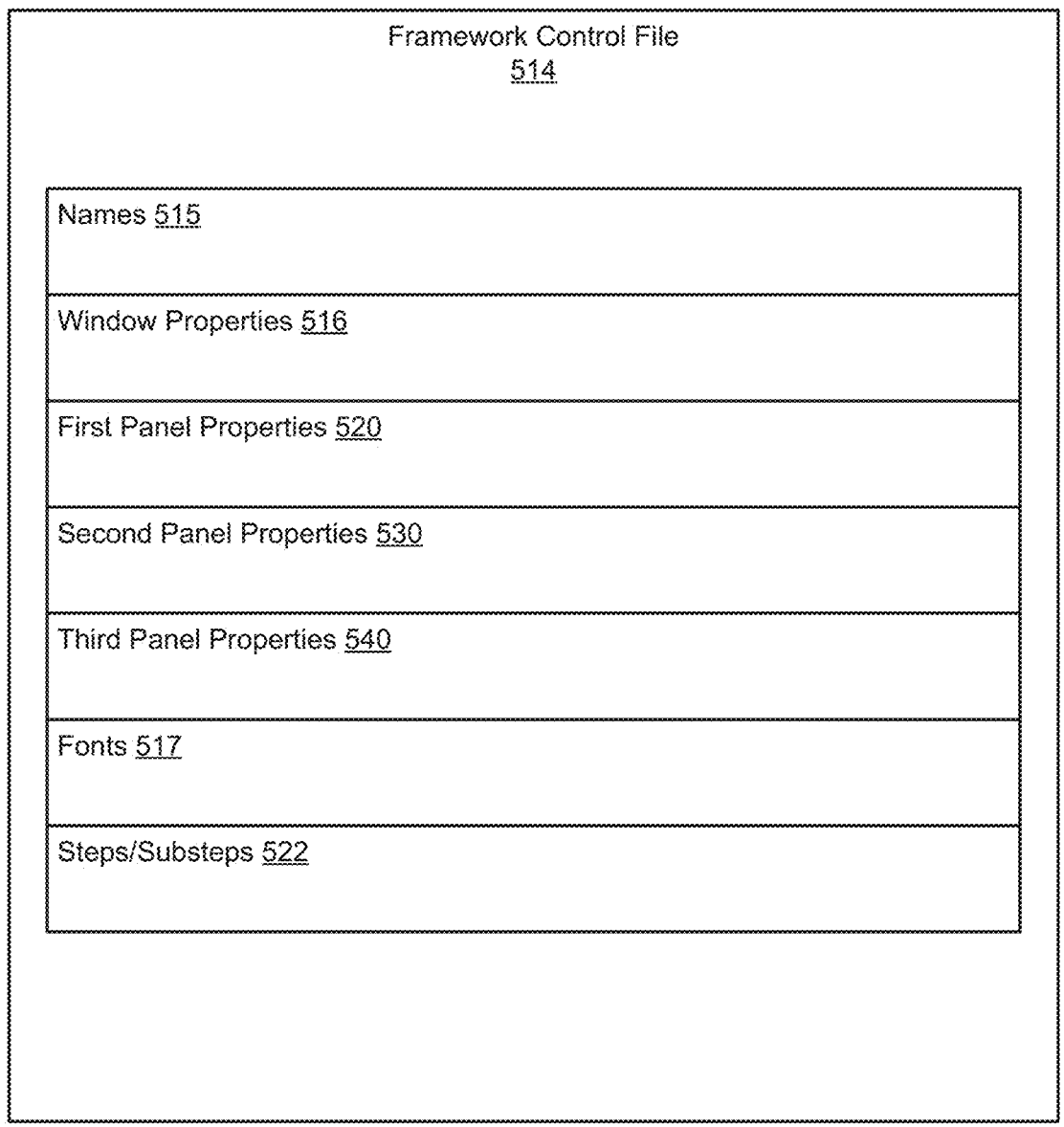
FIG. 5 is a block diagram of a framework control file according to an example.

FIG. 5 is a block diagram of a framework control file 514 according to an example. The framework control file 514 includes names 515, window properties 516, first panel properties 520, second panel properties 530, third panel properties 540, fonts 517, and steps/substeps 522.

The framework control file 514 may be referred to by a framework, to enable scriptable and configurable features such as steps, tasks, scripts, and so on that may be used in a demonstration of a live product, without needing to make changes or otherwise alter the at least one live product. The framework control file 514 also may be provided independent of a specific platform, allowing a demonstration to operate on Macintosh operating system (MacOS), Linux, Windows, Android, and so on. In an example, the framework control file 514 may be provided as a Java properties format. In an alternate example, the framework control file 514 may be provided as XML, JavaScript Object Notation (JSON), or in other formats. The demonstration framework program may be provided as an executable on a computing system, and the framework may be supplied with relevant parameters (such as wording for various steps to be demonstrated) and other materials via the framework control file 514.

The framework control file 514 may include various categories. Some specific categories are illustrated for convenience. However, in alternate examples, other categories not specifically shown may be included, and/or one or more categories illustrated in FIG. 5 may be omitted.

The names 515 may include a system name of the demonstration framework, which may appear in Windows as the name in the task bar, and the title that is displayed in the Features Panel. The names 515 also may refer to optional startup and shutdown scripts. Script file(s) may be stored in the scripts subdirectory of the configuration directory. The script file(s) are to be executed when the configuration is selected in a framework demonstration selector (startup script), during a demonstration, or when the demonstration is exited (shutdown script).

The window properties 516 is to specify one or more window locations, e.g., using x,y coordinates of the windows. Negative numbers may be used to represent pixels left and/or above the root location. The coordinates default to 0,0. The window properties 515 also may include width, height, colors, and other window information (such as panels and live product windows), as well as references to logo images, default images, and locations of windows for the various framework panels.

The first panel properties 520 may include references to steps and/or associated information such as scripts, features, tasks, and so on. The first panel properties 520 may include text to be displayed with a step, features to be highlighted in association with a step, a content/image to be displayed in the second panel, corresponding to a step in the first panel. Such information also may be included as substep(s), including a hierarchical nesting level of the substep. A step may be represented as a substep any number of sub-levels deep from a given step, as indicated in the first panel properties 520. Thus, the term substep as used herein may carry the same features as a step, at a hierarchical menu level that is once-removed from its parent step. The first panel properties 520 may specify zero or more substeps. The information on the steps and substeps may be specified separately from, or in addition to, the first panel properties 520, as the steps/substeps 522 information.

The first panel properties 520 also may specify additional information for a step, such as text and/or HTML anchor tag information that may be used in the step text to cause the script to be displayed as a hyperlink in the step.

The second panel properties 530 may describe frame and/or hole properties, to generate corresponding frames/holes with associated characteristics in the second panel for the corresponding step.

The third panel properties 540 may include information for the features 442 (FIG. 4), such as spacing, text, feature number, and so on.

The fonts 517 may include font style and size information for various features, headings, steps, navigation elements, and so on.

The steps/substeps 522 may be used to described the steps/substeps, in conjunction with or separate from the first panel properties 520 as set forth above.

In an example, a framework control file 514 may include information to refer to other materials, such as separate batch scripts and/or image files. The framework control file 514 may be edited using a text editor. In an alternate example, a configuration editor may be used, which may include examples ranging from a simple properties editor, to a full 'what you see is what you get' (WYSIWYG) visual editor. Such editors may enable an instance of the demonstration framework (and other components/scripts/elements) to be updated in real-time as the demonstration is edited and/or its properties are changed. In an alternate example, the demonstration framework may be extended to support a series of connector libraries, which may be custom built for common firmware/software applications, and integrated into the demonstration framework for enhanced demonstration capabilities (accessed via configuration properties).

Figure 6:
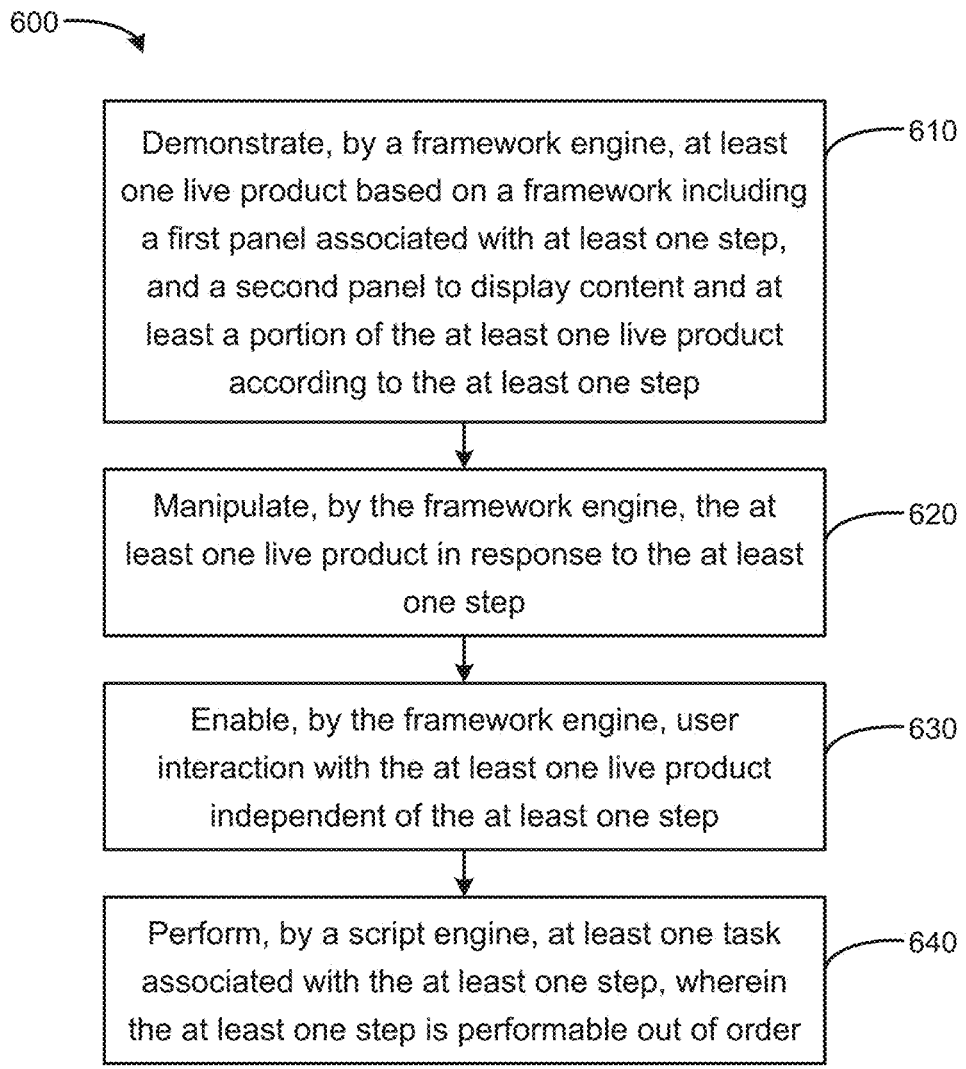
FIG. 6 is a flow chart of an example process for demonstrating live products.

Referring to FIG. 6, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 6 is a flow chart 600 based on performing a task associated with a step according to an example. In block 610, a framework engine is to demonstrate at least one live product, based on a framework including a first panel associated with at least one step, and a second panel to display content and at least a portion of the at least one live product according to the at least one step. For example, a step (in the first panel) to be demonstrated may be clicked by the user to cause the framework engine to overlay explanatory text/image on the live product application (displayed in the second panel). In block 620, the framework engine is to manipulate the at least one live product in response to the at least one step. For example, the framework engine may receive user interaction to a graphical step element in the framework, and in response, the script engine may cause the live product application to perform an example task, such as complete a calculation and display a live window in the second panel. In block 630, the framework engine is to enable user interaction with the at least one live product independent of the at least one step. For example, the framework may allow the user to directly manipulate the live product window, close it, open a new window, and resize/move the live product window. In block 640, a script engine is to perform at least one task associated with the at least one step, wherein the at least one step is performable independent of an order in which the at least one step is presented by the framework. For example, the framework may direct the script engine to execute a script associated with the step, to execute a task to "clean up" the live application windows and re-arrange the live application windows in preparation for a next step. In an example, the script engine may execute a script automatically, in response to interaction with framework elements, and/or in response to another task/step/script.

Examples provided herein may be implemented in hardware, software, or a combination of both. Example systems can include a processor and memory resources for executing instructions stored in a tangible non-transitory computer-readable media (e.g., volatile memory, non-volatile memory, and/or computer-readable media). Non-transitory computer-readable media can be tangible and have computer-readable instructions stored thereon that are executable by a processor to implement examples according to the present disclosure. The term "engine" as used herein may include electronic circuitry for implementing functionality consistent with disclosed examples. For example, framework engine 110 and script engine 150 of FIG. 1 may represent combinations of hardware devices and programming to implement the functionality consistent with disclosed implementations. In some examples, the functionality of engines may correspond to operations performed by user actions, such as selecting steps to be executed by processor 202 (described above with respect to FIG. 2).

What is claimed is:
1. A computing system comprising:
 a processor;
 a non-transitory storage medium storing framework instructions executable on the processor to provide a framework that demonstrates a live product that is executable in a machine environment independently from the framework instructions, wherein the framework includes a first graphical user interface (GUI) panel comprising a plurality of graphical elements representing respective steps of a demonstration of the live product, and a second GUI panel to display content and at least a portion of the live product according to the steps, the first GUI panel presenting the steps in a first order, wherein the steps are customizable for different audiences of the demonstration of the live product, the graphical elements in the first GUI panel selectable to navigate through the demonstration, wherein the steps are performable responsive to selections of the graphical elements in an order different from the first order in which the steps are presented by the first GUI panel; and
 a script executable in response to user selection of a graphical element representing a first step of the steps in the first GUI panel, where execution of the script causes manipulation of a feature of the live product.

2. The computing system of claim 1, further comprising a framework control file comprising configuration information accessible by the framework instructions to provide at least one of a further script, a step, or a substep in the framework.

3. The computing system of claim 1, wherein the first step of the first GUI panel further includes a substep selectable by a user.

4. The computing system of claim 1, wherein the first GUI panel includes a navigation element, wherein the framework instructions are executable to, in response to user selection of the navigation element, navigate through the steps.

5. The computing system of claim 1, wherein the framework instructions are responsive to the script to perform a task to change the content displayed in the second GUI panel.

6. The computing system of claim 1, wherein responsive to the execution of the script, the framework instructions are to perform a task to automatically test for a presence of a window of the live product, and if the window of the live product is not present, cause the live product to launch the window.

7. The computing system of claim 1, wherein responsive to the execution of the script, the framework instructions are to perform a task to automatically test for an attribute of a window of the live product, and if the attribute is not consistent with a second step of the steps, the framework instructions are to manipulate the window of the live product to be consistent with the second step.

8. The computing system of claim 1, wherein the second GUI panel includes a hole that is positionable by the framework instructions to frame a portion of the live product to be shown through the hole.

9. The computing system of claim 1, wherein the framework instructions are executable to display the first GUI panel on a first display screen, and the second GUI panel on a second GUI display screen separate from the first display screen.

10. The computing system of claim 1, wherein the framework instructions are executable to display a third GUI panel associated with a feature of the demonstration, wherein the framework instructions are executable to highlight the feature in response to a step corresponding to the feature being active.

11. A method, comprising:
demonstrating, by framework instructions executed by a computer, a live product that is installed in a machine environment independently of the framework instructions, the demonstrating displaying a framework including a first panel comprising a plurality of graphical elements representing respective steps of a demonstration of the live product, and a second panel to display content and at least a portion of the live product according to the steps, the first panel presenting the steps in a first order, wherein the graphical elements in the first panel are selectable to navigate through the demonstration; and
executing, by script instructions executed by the computer, a script in response to user selection of a graphical element representing a first step of the steps, wherein the steps are performable responsive to selections of the graphical elements in an order different from the first order of the steps presented by the first panel.

12. The method of claim 11, further comprising checking, by the framework instructions, attributes of the live product in response to executing the script, and manipulating, by the script, the attributes of the live product.

13. A non-transitory machine-readable storage media storing framework instructions executable by a computing system that, when executed, cause the computing system to:
demonstrate a live product executable in a machine environment, the demonstrating based on a framework including a first panel comprising a plurality of graphical elements representing respective steps of a demonstration of the live product, and a second panel to display content and at least a portion of the live product according to the steps, the first panel presenting the steps in a first order, wherein the graphical elements in the first panel are selectable to navigate through the demonstration, wherein the live product is independent of the framework instructions; and
execute a script in response to user selection of a graphical element representing a first step of the steps in the first panel, where execution of the script causes manipulation of a feature of the live product, wherein the steps are performable responsive to selections of the graphical elements in an order independent of the first order in which the steps are presented by the first panel.

14. The non-transitory machine-readable storage media of claim 13, wherein the framework includes a third panel associated with a feature, wherein the framework instructions when executed cause the computing system to highlight the feature in response to a step of the steps corresponding to the feature being active.

15. The computing system of claim 1, wherein the framework instructions are executable on the processor to display, in the framework, guidance information to guide a user in demonstrating the live product as part of the demonstration.

16. The computing system of claim 1, wherein the framework instructions are executable on the processor to execute the script in response to user selection of a hyperlink in the graphical element representing the first step.

17. The computing system of claim 1, wherein the framework instructions are executable on the processor to execute a second script in response to user selection of a graphical element representing a second step of the steps, and execution of the second script causes the second script to check whether the live product is currently executing, and in response to the live product not currently executing, cause execution of the live product.

18. The method of claim 11, further comprising:
executing a second script in response to user selection of a graphical element representing a second step of the steps;
checking, by the second script, whether the live product is currently executing; and
in response to the live product not currently executing, causing execution of the live product.

19. The non-transitory machine-readable storage media of claim 13, wherein the framework instructions when executed cause the computing system to customize different steps in the first panel for different audiences of the demonstration.

20. The non-transitory machine-readable storage media of claim 13, wherein the framework instructions when executed cause the computing system to:
execute a second script in response to user selection of a graphical element representing a second step of the steps;
check, by the second script, whether the live product is currently executing; and in response to the live product not currently executing, cause execution of the live product.

\* \* \* \* \*